United States Patent

[15] 3,662,621

Hirozawa

[45] May 16, 1972

[54] SPEED RESPONSIVE TRANSMISSION

[72] Inventor: Koichiro Hirozawa, Kariya, Japan

[73] Assignee: Aisin Seiki Kabushiki Kaisha, Kariya Aichi Pref., Japan

[22] Filed: May 26, 1970

[21] Appl. No.: 40,651

[30] Foreign Application Priority Data

May 30, 1969 Japan..................................44/42840

[52] U.S. Cl...........................................................74/731
[51] Int. Cl........................................................F16h 47/08
[58] Field of Search........................74/731, 645; 192/3.33

[56] References Cited

UNITED STATES PATENTS

| | | | |
|---|---|---|---|
| 2,302,714 | 11/1942 | Pollard | 74/731 X |
| 2,404,657 | 7/1946 | Roberts et al. | 74/731 X |
| 2,699,074 | 1/1955 | Livezey et al. | 74/645 |
| 2,913,931 | 11/1959 | Hilpert | 74/731 |
| 2,970,498 | 2/1961 | Murray et al. | 192/3.33 X |
| 3,359,830 | 12/1967 | Liang | 74/731 |
| 3,394,618 | 7/1968 | Dhonau | 74/731 |
| 3,556,271 | 1/1971 | Hilpert | 192/3.33 |

Primary Examiner—Carlton R. Croyle
Assistant Examiner—Thomas C. Perry
Attorney—Sughrue, Rothwell, Mion, Zinn & Macpeak

[57] ABSTRACT

This invention relates to improvements in a control mechanism for fluid-operated automatic speed change mechanisms of an automotive vehicle which comprises a fluid coupling having a pump wheel and a turbine wheel, with an adjusting valve adapted for increasing the hydraulic line pressure in response to a signal from a first sensor sensing an increase in the rotational speed of the pump wheel and adapted for decreasing the hydraulic line pressure in response to a signal from a second sensor adapted for sensing an increase in the rotational speed of the turbine wheel.

5 Claims, 2 Drawing Figures

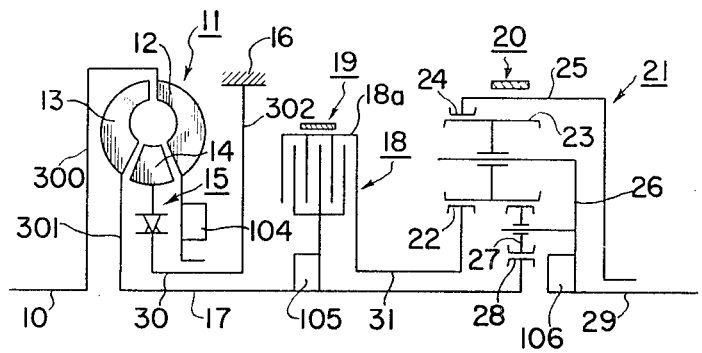
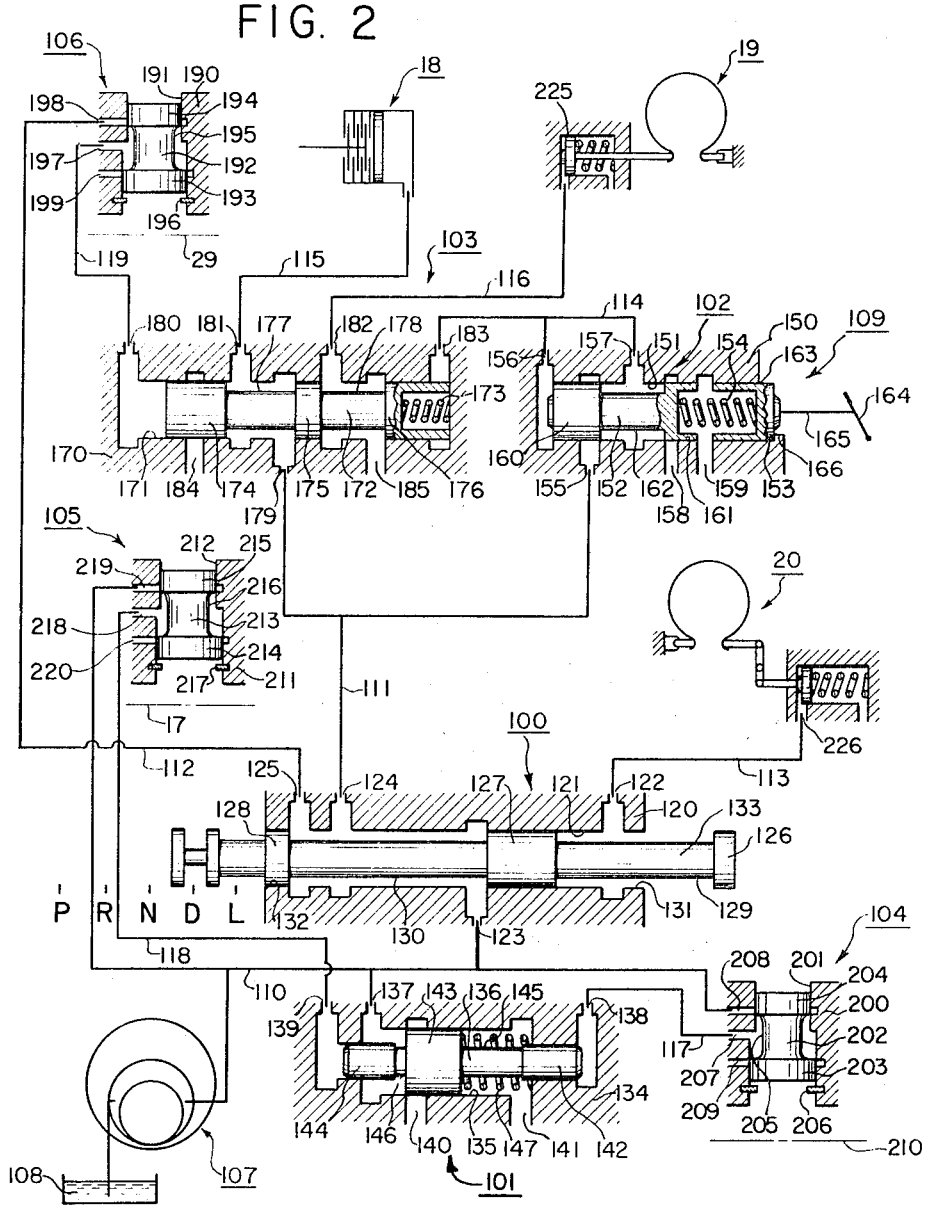

SPEED RESPONSIVE TRANSMISSION

This invention relates to improvements in and relating to a control mechanism for the fluid-operated automatic speed change mechanism of an automotive vehicle.

This kind of automatic speed change mechanism comprises generally at least a fluid delivery pump; and a plurality of valve means adapted for controlling the pressure fluid flows to be supplied to several fluid-operated clutch units and brake units arranged for adjusting several gearings in the speed change mechanism, these valve means being so designed and arranged that each of them controls the related oil flow in an accurate and precise way over a wide range of the working conditions, so as to provide a possible highest performance at every functional stage of the speed changer. Therefore, it must be sensitively operative to the every vehicle running and loaded conditions. As an example, the function controlling line pressure must be precisely controlled so as to meet with every working condition of the speed change mechanism as the occasion may desire within a specifically adopted operation range thereof. Under a heavy load condition as met during the starting period of the automotive vehicle, the line pressure should be controlled to a certain high value for providing hydraulically operated clutch units or brake units with ample engaging efforts, so as to transmit a higher output power from the drive engine to the driven vehicle wheels. On the contrary, when the vehicle runs at a high speed or under a lightly loaded condition, the transmitting torque is naturally relatively small, thus the line pressure being set to a lower level, and it is highly desirous to perform the engagement and disengagement of the clutch or brake means provided at several places within the speed change mechanism with the least possible shock. It will thus be seen from the foregoing that the function control of the automatic speed change mechanism must be so that the hydraulic line pressure is adjusted depending upon the vehicle running condition. In the prior art automatic speed change mechanism, therefore, the arrangement is such that for satisfying the aforementioned contradictory requirements, the line pressure is controlled as a function of the engine throttling degree and the vehicle travelling speed in a certain artificial way. In an alternative way, an accumulator, orifice control valve or the like means is used for the generating of a time lag in the line pressure oil supply to or oil discharge from the clutch or brake means. According to our experiments, these prior proposals are far from the ideal. Especially, substantial obviation of clutching or braking shocks is not satisfied which constitutes naturally a drawback inherent of most concern in the practice of the prior art.

The main object of the invention is to provide an efficient control mechanism for an automatic automotive speed change mechanism capable of substantially obviating the hitherto unavoidable clutch shocks appearing in the course of the speed change operation.

In the control mechanism of the above kind and embodying the novel principles of the invention, means are provided for detecting the variation in the speed ratio of the speed change mechanism that is, the ratio between the input revolutions and the output revolutions at the torque converter contained in the speed changer, and a further means adapted for controlling said line pressure in response to the thus sensed variation under every load and running condition of the vehicle.

A further object is to provide an improved control mechanism of the above kind by which conventionally encountering shocks caused by speed change operations can be substantially reduced.

These and further objects, features and advantages of the invention will become more apparent when reading the following detailed description of the invention by reference to the accompanying drawings, in which:

FIG. 1 is a schematic and explanatory half view of essential power-transmitting constituents of an automatic fluid-operated speed change mechanism which is adapted for cooperation with the control mechanism according to this invention.

FIG. 2 is a substantially sectional general arrangement view of the control mechanism according to this invention shown in its preferred embodiment.

Referring now to FIG. 1, illustrative of essential power-transmission parts of an automotive automatic speed change mechanism of the conventional forward two speed and backward one speed type, the numeral 10 denotes a drive or input shaft which consists of the crank-shaft of a drive or internal combustion engine, not shown, fitted on a automotive vehicle, not shown, while the numeral 29 represents a driven or output shaft adapted for driving automotive vehicle wheels, not shown, and 17 denotes an intermediate shaft arranged between the input and the output shaft. As may be well supposed, these input, intermediate and output shafts are arranged coaxially one after another and mounted rotatably within the casing of the speed changer. Since this speed changer per se is of the conventional design, the casing is shown only partially and in a highly simplified way at 16. In this housing 16, a torque converter unit 11, a planetary gearing unit 21, a clutch unit 18, a front brake unit 19 and a rear brake unit 20 are also provided as seen, all these units being of the conventional design.

The torque converter unit 11 comprises a pump wheel 12, a turbine wheel 13 and a stator wheel 14 as in the conventional way. Pump wheel 12 is fixedly attached through a carrier 300 onto the input shaft 10, said carrier being shown only in a highly simplified way by a line. Turbine wheel 13 is fixedly mounted on the intermediate shaft 17 through a further carrier 301 and stator wheel 14 is mounted through one way brake unit 15 on a first sleeve shaft 30 which is rigidly mounted through a connecting member 302, shown only schematically by a straight line, with the stationary housing 16.

Planetary gearing unit 21 comprises a first sun gear 28, a second sun gear 22, a ring gear 24, a first set of planetary gears 23, of larger gear thickness, of which only one is representatively shown, and a second set of planetary gears 27 of shorter gear thickness, of which only one is shown again, all these planetary gears being rotatably mounted on a carrier 26 shown again in a highly simplified way.

First sun gear 28 is rigid with the intermediate shaft 17 and second sun gear 22 is made rigid with a second sleeve shaft 31 which is made rigid with the drum at 18a of clutch unit 18. Gear carrier 26 is made rigid with the output shaft 29. Ring gear 24 is made as part of the drum 25 which is rotatably mounted on the output shaft and rolatable relative thereto.

Planetary gears 23 are kept in mesh with ring gear 24, second sun gear 22 and planetary gears 27. Clutch unit 18 can operate to couple second sun gear 22 with first sun gear 28 into a rigid unit. Both sun gears 22 and 28 are then driven by the intermediate shaft 17. More specifically, first sun gear 28 is driven by the shaft 17 when the clutch 18 is kept in its disengaged position, while both gears 22 and 28 are driven simultaneously by the same shaft when clutch 18 is engaged.

Brakes 19 and 20 are arranged so as to apply braking effort onto the respective drums 18a and 25 for bringing second sun gear 22 and ring gear 24 into respective stationary position. Clutch unit 18 and brakes 19 and 20 are respectively of the known conventional design and arrangement. The speed changer is so designed and arranged so as to provide a high speed forward step, a low speed forward step and a single rearward speed step, as will be more fully described hereinafter.

With the clutch 18 and brakes 19 and 20 kept in their disengaged position, the transmission is kept in its neutral position, thereby none of driving torque being transmitted from input shaft 10 to output shaft 29.

When front brake unit 19 is brought into engagement so as to brake the related drum 18a for bringing second sun gear 22 into its stationary condition, while clutch unit 18 and rear brake unit 20 are kept in their disengaged position, the automotive vehicle is ready for starting. In this case, second sun gear 22 will act as a reaction member for the planetary gear unit 21 and the engine torque will be transmitted from input shaft 10 through torque converter 11, intermediate shaft 17, first sun gear 28, planetary gears 25; 27 and gear carrier 26 to output shaft 29. As was briefly hinted hereinbefore, the output shaft is mechanically connected through a certain mechanical means, not shown, to a drive wheel, not shown, which is arranged to drive the vehicle wheels.

When it is desired to transmit a high speed driving force, clutch unit 18 is engaged and brake units 19 and 20 are brought into their disengaged position. With the unit 18 engaged, both sun gears 22 and 28 are united together and planetary gear unit 21 is brought into its fixed position so that a direct coupling between the intermediate shaft 17 and the output shaft 29 is realized.

The rearward drive for the vehicle is realized by actuating the rear brake unit 20 and releasing the front brake unit 19. In this case, the engine drive torque is transmitted from input shaft 10, torque converter 11, intermediate shaft 17, gears 27; 23 and gear carrier 26 to output shaft 29.

Brake unit 20 acts to keep the ring gear 24 in its stationary position so as to act as a reaction member. Thus, the forward drive torque supplied to first sun gear 28 is reversed in its direction by the intermediary of planetary gear unit 21; and gear carrier 26 and output shaft 29 are driven in the opposite direction to the rotational movement of the input shaft 10.

The control mechanism according to this invention and adapted for control of the function of the automatic speed changer shown generally in FIG. 1 is shown in its representative and preferred embodiment.

In this control mechanism, there is provided a plurality of valves as follows:

| | |
|---|---|
| manually operatable valve | 100; |
| adjusting valve | 101; |
| throttle valve | 102; |
| shift valve | 103; |
| first governor valve | 104; |
| second governor valve | 105; |
| third governor valve | 106; |
| down shift valve | 109; |

There is provided a pump 107 which is driven from the drive engine for delivering oil from a reservoir 108 to the aforementioned several valves. Pump 107 is connected through piping means 110 to adjusting valve 101, manual valve 100 and first governor valve 105. Manual valve 100 is connected through piping means 111 to valves 102 and 103; and through piping means 112 to third governor valve 106; and through piping means 113 to the hydraulic working chamber of rear brake unit 20. Throttle valve 102 is connected through piping means 114 to shift valve 103 which is connected in turn through piping means 115 to the hydraulic working chamber of clutch unit 18; and through piping means 116 to the hydraulic working chamber of brake unit 19. The hydraulic pressures upon subjected to control at valves 104 and 105 are applied through respective conducts 117 and 118 to the opposite ends of said valve 101.

Third adjusting valve 106 is connected through piping 119 to shift valve 103.

Manual valve 100 comprises a valve housing 120 having a longitudinal bore 121; and a spool valve member 133 mounted slidably in the latter. Valve bore 121 is kept in fluid communication with several ports 122; 123; 124 and 125. Valve member 133 is formed with lands 126; 127 and 128 as shown, thereby providing ring-shaped liquid spaces 129 and 130 between each respective neighboring pair of said lands. Port 123 is connected fluidically with the conduit 110; and port 122 is connected with the conduit 113. Port 124 is fluidically connected with conduit 111; port 125 with conduit 112; and ports 131 and 132 formed at the both ends of valve bore 121 are arranged to serve as discharge openings leading to oil reservoir 108, should the valve lands 126 and 128 not cover occasionally and selectively these ports. Valve 133 has five selectively shiftable positions or more specifically the parking position "P"; the reverse drive position "R"; the neutral position "N"; the automatic speed change position "D" for low and high speeds; and the forward low speed position "L." By the respective shift of the valve member, various ports formed through the wall of valve housing 120 may naturally and differently connected with each other, as will be more fully described hereinafter.

Adjusting valve 101 has the function for control of the oil pressure delivered from pump 107 and is provided with a longitudinal stepped bore 135 formed in a valve housing 134; and comprises a spool valve member 136 slidably mounted in said valve bore and an urging spring 147 for said valve member, the spring being mounted within said valve bore as shown.

Valve body or housing 134 is formed with several ports 137; 138; 140 and 141 which fluidically communicate with the valve bore 135. Valve member 136 is formed with several lands 142; 143 and 144. Land 142 has the same diameter as land 144; and land 143 has a larger diameter. Valve member 136 is thus formed with ring-shaped liquid spaces 145 and 146. Port 137 is connected hydraulically with conduit 110; port 138 with conduit 117; port 139 with conduit 118; and ports 140 and 141 are opened towards the liquid reservoir 108.

Throttle valve 102 and down-shift valve 109 is formed with a common valve bore 151 formed within its valve body or housing 150, and the combined valve assembly comprises a throttle valve member 152 and a down-shift valve member 153 shiftably mounted within said valve bore, a compression spring 154 being inserted under pressure between these valve members.

Valve housing 156 is formed with ports 155; 156; 157; 158 and 159 which are fluidically connected said valve bore 151.

Throttle valve member 152 is formed with valve lands 160 and 161 having a common outside diameter and a ring space 162 formed therebetween. Down-shift valve 153 is formed with land 163 and arranged to be shiftable along its longitudinal axis when subjected to a manual force transmitted thereto from a conventional accelerator pedal 164 through a connection means 165. By the provision of a positioning projection 166 on the valve body 150, the down-shift valve is limited in the range of its rightward movement in FIG. 2.

Port 155 is fluidically connected with piping means 111; port 156 and 157 with piping means 114; while ports 158 and 159 are connected with oil reservoir 108, although the connection piping serving for this purpose have been omitted for simplicity.

Shift valve unit 103 comprises a valve housing 170 formed with valve bore; and a shift valve member 172 slidably mounted in this bore, a compression spring 173 being provided for urging the valve member to move leftwards in FIG. 2. Valve housing 170 is formed with ports 179; 180; 181; 182; 183; 184 and 185 which are kept in communication with the valve bore if the valve member does not block them.

Shift valve member 172 is formed with lands 174; 175 and 176 having a common outside diameter; thereby two separate ring-shaped liquid spaces 177 and 178 being formed.

Port 179 is fluidically connected with piping means 111; port 180 with piping means 119; port 181 with piping means 115; port 182 with piping means 116; and port 183 with piping means 114; ports 184 and 185 are opened to oil reservoir 108, although the connection means have been omitted to oil reservoir 108.

Third governor valve unit 106 comprises a valve housing 190 which is arranged to rotate in unison with output shaft 29 and formed with a stepped bore 191 receiving slidably a spool valve member 192. A snap ring 196 is positioned in the lower part of the valve housing 190 for limiting the downward movement of the spool 192 towards 29 in FIG. 2. Valve member 192 is formed with a first land 193 and a second land 194, the latter having a smaller outside diameter than the former and a ring-shaped liquid space being formed between these two valve lands. Valve housing 190 is formed with several ports 197; 198 and 199. Port 197 is fluidically connected with piping means 119; port 198 with piping means 112; while port 199 is opened to oil reservoir 108, although the connection piping have omitted from the drawing for simplicity.

First governor valve unit 104 comprises a valve housing 200 having a stepped bore 201 and being arranged for unitary rotation with the pump wheel 12 of converter unit 11. The unit 104 is provided with a spool valve member 202 slidably received in the valve bore 201 and the wall of said bore is provided with a snap ring 206 serving motion limiter for the downward movement of valve spool 202 towards an axis 210.

Valve spool 202 is formed with a first land 203 and a smaller second land 204, a ring groove 205 being formed therebetween. Valve housing 200 is formed with several ports 207; 208 and 209. Port 207 is fluidically connected with piping means 117; port 208 with conduit 110; and port 209 is opened to oil reservoir 108.

Second governor unit 105 comprises a valve housing 211 which is formed with a bore 212 and arranged to perform a unitary rotation with the intermediate shaft 17 rigid with said turbine wheel 13 of the converter unit 11. Valve spool 213 is formed with a first land 214 and a second or smaller land 215, a ring groove 216 being formed therebetween. Valve housing 211 is formed with ports 218; 219 and 220. Port 218 is fluidically connected with piping means 118 and port 219 with piping means 110, while port 220 is opened to oil reservoir 108, although the connecting piping has been omitted from the drawing only for simplicity.

The operation of the control mechanism so far shown and described is as follows.

With the manual valve unit 100 kept in its neutral position "N" in FIG. 2, the driver starts the automotive engine for actuating the pump 107. Oil is therefore sucked from reservoir 108 by the pump 107 which delivers pressurized oil through piping means 110 to inlet port 137 of the adjusting valve unit 101; inlet port 123 of the manual valve unit 100; inlet port 208 of first governor valve unit 104; and inlet port 219 of second adjusting valve 105.

Pressure oil supplied to inlet port 137 acts upon the differential cross-sectional area between the valve lands 143 and 144 on valve spool 136 and the latter is hydraulically urged against the action of return spring 147 to move rightwards in FIG. 2. With the rightward movement of valve spool 136, port 140 is opened and oil is discharged therethrough to oil reservoir 108. Upon the opening of port 140 by the rightward shift of valve land 143, the oil pressure in piping means 110 will be reduced, until the hydraulic force acting upon the differential area between valve lands 143 and 144 will become balance with the spring force at 147. In this way, the regulator valve unit 101 acts to regulate the pressure level in the conduit menas 110. The thus adjusted pressure in the conduit 110, hereinafter called "line pressure" throughout the specification, is conveyed to the inlet port 208 of first governor valve unit 104, the inlet port 219 of second governor valve unit 105 and the inlet port 123 of manual valve unit 100. Since the pump wheel 12 is kept in rotation, the valve housing 200 of unit 104 is also kept in rotation about the shaft axis 210 so that valve member 202 is urged centrifugally to shift upwards in FIG. 2, thereby the inlet port 208 being opened by the removal of the hitherto closing valve land 204. Pressure oil will therefore invade through the thus opened inlet port 208 into the bore of the valve unit 104 and act upon the differential area between the lands 203 and 204. In this way, the valve member 202 will be urged hydraulically against the aforementioned centrifugal force to move downwards by which the land 203 will open the discharge port 209. In this way, governor valve unit 104 will adjust the output pressure from conduit 207 in accordance with the occasional rotation of pump wheel 12 or more specifically in function of the revolutional speed of the drive engine. This output hydraulic pressure from conduit 207 will be referred to as "first governor pressure" hereinafter.

Second governor valve unit 105 acts in the similar way to first governor valve unit 104, a second governor pressure which is the output hydraulic pressure from the port 218 is delivered to the conduit 118, upon being subjected to an adjustment in function of the rotational speed of the intermediate shaft 17 which is equal to that of turbine wheel 13.

The line pressure fed from the conduit 110 to input port 123 of manual valve unit 100 is checked by valve land 127 on spool 133 from invading into the corresponding valve bore.

The forward low speed drive mode is established by manipulating manual valve 100 to either "L"-position or "D"-position. With the valve spool 133 positioned at "L"-position, the line pressure prevailing in the conduit 110 is fed to port 124 only on account of the closure of port 125 by valve land 128, thence through conduit 111 to both the inlet ports 179 and 155. When the valve spool 133 is manually adjusted to either "L"- or "D"-position at a low vehicle speed, valve member 172 of shift valve unit 103 is urged by spring pressure at 173 to move leftwards, until port 179 being brought into fluid communication with the ring space 178 formed between valve lands 175 and 176, said space 178 being kept in fluid communication with port 182. Thus, the line pressure in conduit 111 will be conveyed therefrom through port 179, ring space 178, port 182 and conduit 116 to the hydraulic working chamber 225 for actuation of brake unit 19. Upon actuation of the brake unit 19, the low speed drive ratio is established as was referred to hereinbefore.

On the other hand, the line pressure will be conveyed through inlet port 155 of throttle valve unit 102; ring space 162 on valve member 152; port 157; conduit 114 and port 156 to the left-hand side of the land 160 on valve spool 152. This hydraulic pressure counteracts the spring pressure at 154 which spring has been further compressed from its initially inserted state by the occasional shift of down-shift valve 153 upon manual actuation of acceleration pedal 164, the depression thereof being transmitted through the connection member or push rod 165 to the valve spool part 153. When the thus applied hydraulic pressure exceeds the counter action of the spring 154, valve member 152 is moved rightwards. With rightward movement of valve member 152, the land 160 is brought into registration with port 155 so as to close it, while the land 161 will recede from its closing position for the discharge port 158 which is thus opened.

With the discharge port 158 thus opened, the hydraulic pressure in conduit 114 is reduced, until it, now acting on the land 160, balances the spring pressure at 154. In this way, the throttle valve 102 controls the hydraulic pressure in conduit 114 in function of the depressed amount of the accelerator pedal.

The hydraulic pressure thus modulated by the throttle valve 102 will be referred to as "throttle pressure" hereinafter. This throttle pressure is conveyed from conduit 114 to the port 183 of shift valve 103 so that shaft valve members 172 is urged hydraulically to move leftwards.

With the manual valve 100 positioned at "L," the valve member 172 is kept always at its left position, because there is no counter-acting force against the throttle pressure and the spring pressure at 173.

With the valve spool 133 of manual valve 100 positioned at "D"-position, the line pressure is supplied through port 125 in valve housing 120; conduit 112; and port 198 in valve housing 190 of third governor valve unit 106, other operational features being substantially same as before with the valve spool held at "L"-position.

Third governor valve 106 acts in the similar way with said first or second governor valve 104 or 105, and the third governor pressure upon subjected to adjustment in function of the rotational speed of output shaft 29 in terms of the vehicle speed is fed from output port 197 to conduit 112. The third governor pressure in the conduit 112 is applied now to the left-hand side of valve land 174 on spool 172 of the shift valve unit 103 and counter balances the leftward urging force exerted by spring 173. So far as the third governor pressure is smaller than the combination of the spring force 173 with the throttle pressure, the shift valve 172 is positioned at its left-hand end position in FIG. 2, thereby the low speed drive ratio being established.

On the other hand, when the third governor pressure force becomes larger than the spring pressure 173 plus throttle pressure, shift valve 172 will be shifted to the position in FIG. 2. By this valve shift, the input port 179 adapted for reception of the line pressure is brought into fluid communication with the ring groove 177 formed between the lands 174 and 175 so that ports 179 and 181 are kept in fluid communication, and at the same time, port 182 hitherto kept in communication with port 179 is brought into fluid connection with the discharge port 185. This results in the actuation of clutch 18 and brake 19 is released for establishing the high speed drive stage.

The down-shift from the forward high speed stage to the forward low speed stage is realized at a lower vehicle speed when the third governor pressure becomes smaller than the sum of spring pressure at 173 and throttle pressure for urging the valve member 172 to the left-hand position.

A forced down-shift from the forward high speed stage to the forward low speed stage will be realized by depressing the accelerator pedal 164 to a certain limit destined for that function.

With the accelerator pedal 164 depressed so far, the spring 154 is further compressed in a corresponding way so that the left-hand end of down-shift valve 153 is brought into a direct contact with the throttle valve 152 for urging the latter to move leftwards and the input port 155 is uncovered by valve land 160. In this way, the throttle pressure in the conduit 114 will become equal to the line pressure. Since the line pressure is higher than the governor pressure, the shift valve 172 is moved towards left so that the low speed drive stage is realized. The reverse drive stage is realized by manipulating the manual valve 100 to its "R"-position. With this shifted position of the valve 100, the land 127 on manual valve 133 will interrupt the fluid communication between the ports 123 and 124, while inlet port 123 and port 122 are brought into fluid communication with each other through the intermediary of ring groove 129.

The line pressure fed to port 122 is conveyed further through conduit 113 to the hydraulic working chamber 226 of rear brake unit 20 which is thus actuated for the realization of the rear drive stage.

At this stage, conduits 111 and 112 is opened through port 132 to liquid reservoir 108 and thus the front brake 19 and the clutch 18 are kept in their non-engagement or off-service position.

As will be clearly seen from the foregoing that according to the novel teachings of the present invention, means are provided for sensing the respective revolutional speeds of the input side member or pump wheel of a converter or fluid coupling, and of the output side member or turbine wheel, and that a conventionally adopted adjusting valve means is connected in opposition to a first and a second governor valve for modulating the hydraulic line pressure in response to the aforementioned respective revolutional speeds thus sensed. In this way, the line pressure can be adjusted to respond to the engine output, on the one hand, and to the travelling resistance encountered with the running vehicle, on the other hand. By relying upon such modulated line pressure, various hydraulically operated actuating elements or units such as clutches and brakes contained in a conventional automatic speed change mechanism can each provide an effective engaging effort without inviting otherwise encountered considerable amounts of speed change shocks.

In the foregoing, a kind of hydraulically governor was used as a representative way. Although not shown, however, an electric generator or the like machine can be used in place of the hydraulic unit for sensing the rotational speed of the input or output constituent of the torque converter.

The embodiments of the invention in which an exclusive property or priviledge is claimed are defined as follows:

1. In a control mechanism for an automatic speed change mechanism having an input shaft an an output shaft, a fluid coupling comprising a pump wheel driven by a drive engine through said input shaft, a turbine wheel operatively connected to an intermediate shaft, and a gearing means operatively connected to said intermediate shaft and driven thereby, said gearing means comprising friction-engageable means operatively connected to said gearing means for transmitting torque from said fluid coupling to said output shaft, wherein the improvements comprise in combination: a fluid pressure source for supplying hydraulic fluid pressure to actuate said friction engageable means, passage means communicating said fluid pressure source with said friction engageable means, pressure adjusting valve means communicating with said passage means for regulating the fluid pressure therein, a first sensor means drivingly connected to said pump wheel for sensing the rotational speed of said pump wheel and generating a first output signal, the output of said first sensor means being operatively connected to said adjusting valve means, and a second sensor means drivingly connected to said turbine wheel for generating a second output signal in response to the rotational speed of said turbine wheel, the output of said second sensor means being operatively connected to said adjusting valve means, said adjusting valve means acting to increase the hydraulic line pressure in said passage means in response to said first output signal and decreasing said line pressure in said passage means in response to said second output signal.

2. A control mechanism as claimed in claim 1, wherein said first sensor means comprises a first hydraulic governor means communicated with said passage means, said governor means acting to vary the output pressure thereof as a function of the revolutional speed of said torque converter pump wheel.

3. A control mechanism as claimed in claim 1, wherein said second sensor means comprises a second hydraulic governor means communicated with said passage means, said governor means acting to vary the output pressure thereof as a function of the revolutional speed of said intermediate shaft, said intermediate shaft being coupled with said turbine wheel.

4. A control mechanism as claimed in claim 1, wherein said first sensor means comprises a hydraulic governor means for varying the output pressure thereof as a function of the revolutional speed of said pump, and said second sensor comprises a hydraulic governor means for varying the output pressure thereof as a function of the revolutional speed of said intermediate shaft, said intermediate shaft being coupled with said turbine wheel, said first and second hydraulic governor means being communicated with said passage means.

5. A control mechanism as claimed in claim 1, wherein said adjusting valve means comprises a valve body formed with a stepped valve bore, a valve member formed with a first, second and third lands, said first and third lands being slidably mounted within a small bore of said stepped bore and said second land being slidably mounted within a large bore of said stepped bore for controlling a drain port, a first hydraulic chamber formed by said first land and connected to an outlet port of said second sensor means, a second hydraulic chamber formed between said first and second lands and connected to said passage means, a third chamber formed between said second and third lands in which a spring means is inserted for urging said valve member against the hydraulic pressure of said first and second chambers, and a fourth hydraulic chamber formed by said third land for connecting to an outlet port of said first sensor means.

* * * * *